United States Patent Office 3,418,261
Patented Dec. 24, 1968

3,418,261
POLYMERS PREPARED FROM 2,4,2',4'-
TETRAAMINODIPHENYLALKANES
Albert L. Idelson, Morristown, N.J., and Morton H. Litt,
Cleveland, Ohio, assignors to Allied Chemical Corporation, New York, N.Y., a corporation of New York
No Drawing. Filed Aug. 14, 1967, Ser. No. 660,211
10 Claims. (Cl. 260—2)

ABSTRACT OF THE DISCLOSURE

This invention relates to novel polymers prepared by reacting a 1,1-bis(2,4-diaminophenyl)alkane or an acid salt thereof with a compound selected from the group consisting of N-formylated amines, formic acid and esters of formic acid.

---

In accordance with the present invention, a 1,1-bis-(2,4-diaminophenyl)alkane of the formula

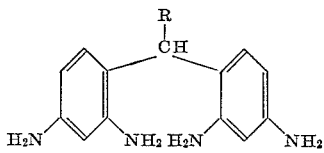

wherein R is hydrogen or an alkyl group of 1 to 5 carbon atoms, or an acid salt of said 1,1-bis(2-4-diaminophenyl) alkane is reacted with a compound selected from the group consisting of N-formylated amines, formic acid and esters of formic acid in an acidic reaction medium having a pH of not greater than 6 to give novel non-cross-linked polymers which possess bactericidal and fungicidal activity.

Although the exact mechanism of the reaction is unknown, it is believed a tetraaminodiphenylcarbinol-type unit forms initially which condenses during the reaction to a polyacridine type unit as illustrated by the following equation:

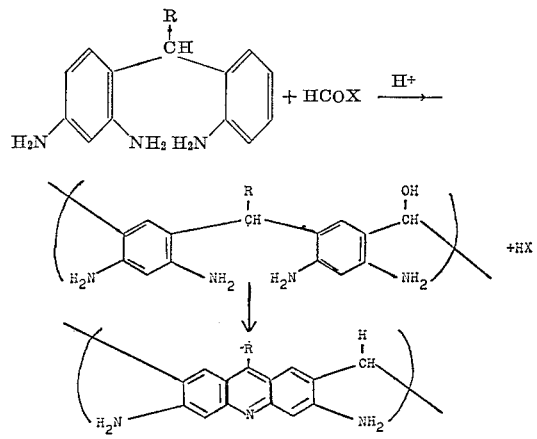

wherein R has the meaning given above, and X represents OH, OR', or NR"$_2$. Since the radical X does not become part of the polymeric product, the groups R' and R" are not critical and can be any group which does not interfere with the reaction. Preferably, R' is a hydrocarbon group of 1 to 15 carbon atoms such as alkyl, aryl, aralkyl and alkaryl groups and R" at each occurrence is independently selected from the group consisting of hydrogen and hydrocarbon groups of 1 to 15 carbon atoms such as alkyl, aryl, aralkyl and alkaryl. The polymers are composed primarily of the above-illustrated polyacridine-type units but a small percentage of m-phenylene diamine type units of the structure

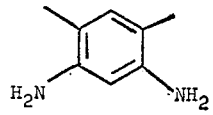

may be present in the polymer. Additionally, there may be present a small percentage of polyacridine-type units of the formula

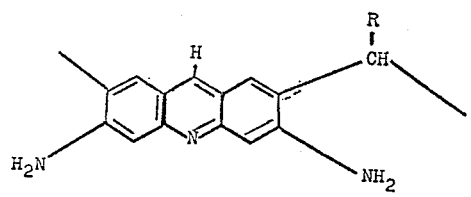

Specific examples of the compounds which can be reacted with the 1,1-bis(2,4-diaminophenyl-alkanes are formic acid, methyl formate, ethyl formate, propyl formate, butyl formate, amyl formate, glycol diformate, benzyl formate, formamide, N-methyl formamide, N-ethyl formamide, N,N-dimethylformamide, N,N-diethylformamide and N,N-diphenylformamide.

It is evident from the solubilities of the polymers that they are not cross-linked. The polymers are soluble in polar solvents such as dimethylformamide, dimethylsulfoxide, N-methyl pyrrolidone, as well as organic acids and aqueous acid solutions. This solubility is of great importance since it enables the polymers to be used as the active ingredient in sterilizing solutions.

The reaction between the 1,1-bis(2,4-diaminophenyl)-alkanes and the above-described coreactants can be carried out in any solvent or solvent mixture which is inert to the reaction and which is a solvent for at least one and preferably both of the reactants. The solvent or solvent mixture is chosen so that the reaction will occur readily at or below its boiling point. Suitable solvents include ethanol, methanol, ethylene glycol, glycerol, tertiary amides having at least two carbon atoms in the acyl group such as dimethyl acetamide and N-methyl pyrrolidone or mixtures of two or more of the above solvents which are miscible with each other.

The reaction medium can be made acidic by the addition of any acid or acid salt which does not interfere with the reaction and is capable of reducing the pH of the reaction to 6 or less. Illustrative of suitable acid compounds are mineral acids such as hydrogen halide, sulfuric acid, phosphoric acid and nitric acid; acid salts such as sodium bisulfate and organic acids such as p-nitrobenzoic acid and fumaric acid. Instead of adding the tetraamine and the acid separately, an acid salt of the tetraamine such as the hydrochloride salt can be employed. The reaction will proceed when the pH of the reaction mixture is 6 or lower. The reaction will proceed at an increased rate as the pH of the reaction mixture decreases.

The temperature of the reaction can range from about 25° C. up to about 250° C. and it is dependent upon the reactivity of the coreactant. The more reactive compounds will require a lower temperature than the less reactive compounds. The time required for reaction will also vary according to the reactivity of the coreactant and according to the solvent employed. The optimum temperature and reaction time for each reactant pair in a given solvent and product desired can be determined by test runs.

Equimolar amounts of the reactants are preferred in our process, but their exact proportion is not critical and up to about 50% excess of N-formylated amine, formic acid or ester of formic acid can be employed.

The polymeric reaction products of the invention are insoluble in basic aqueous solution. Thus, they usually can be recovered conveniently by addition of a base, such as an hydroxide or a carbonate of an alkali metal or an alkaline earth metal, to an acidic water solution of the polymer to precipitate the product which is then washed and dried.

The marked antimicrobic activity of these products contributes to their utility as a preservative for such natural materials as wood, paper, leather, and the like, and for products such as insulation and paints. They can be used as the active ingredients in soaps and cleaning solutions applied to control microorganisms such as bacteria and fungi on surfaces such as walls, floors, furniture and the like. The reaction products of the invention are adsorbed by cellulose and protein and thus are useful to impart permanent sterility to natural fibers such as cotton and wool. In addition, these products, in admixture with a suitable carrier, can be used as agricultural fungicides in the form of dusts, sprays and the like.

The examples below are given to further illustrate the invention, but it is to be understood that the invention is not to be limited to the details disclosed herein.

EXAMPLE 1

The tetrohydrochloride of bis(2,4-diaminophenyl) methane was prepared by reducing bis(2,4-dinitrophenyl) methane dissolved in glacial acetic acid with hydrogen using a 5% palladium on carbon catalyst. During reduction the temperature was maintained at 25° C. After reduction the catalyst was filtered off and anhydrous HCl was bubbled through the filtrate, thereby precipitating the desired product.

177.5 grams (0.47 mol) of bis(2,4-diaminophenyl)-methane tetrahydrochloride, 34.3 grams (0.47 mol) of N,N-dimethylformamide and 1600 ml. of ethylene glycol were charged to a flask fitted with a nitrogen inlet, stirrer and thermocouple and heated under nitrogen at 85°–199° C. for 4 hours. The resultant mixture was cooled to 15° C. and sodium hydroxide added until the product precipitated. The product was filtered, washed with water until neutral, and dried in a vacuum oven at 90° C.

The results of elemental analysis were C, 69.8; H, 5.7; N, 17.1; H₂O, 7.0, which corresponds to a polyacridine having recurring units of the formula

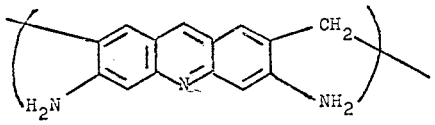

The product was tested for bactericidal activity as follows: A portion was solubilized with a few drops of dimethylsulfoxide and diluted with distilled water to concentrations of 10, 50, 100, 250, 1000, 2000, 3000, 5000 and 10,000 p.p.m. Duplicate test tubes containing 9 ml. of Wright-Mundy Broth received 1-ml. portions of each test dilution so that each tube contained a final concentration of 1, 5, 10, 25, 50, 100, 200, 300, 500 and 1000 p.p.m. of the test material. The tubes were shaken on a Vortex shaker and allowed to stand at room temperature for 15 minutes. 0.1 Milliliter of the inoculum was added to each test tube, shaken on a Vortex shaker and incubated at 35° C. for 72 hours. The tube was examined for growth.

The test organisms were washed with 0.9% saline solution and resuspended in 0.97 saline solution. This subculture was also kept at 35° C. for 72 hours and again examined for growth. The minimum concentration of product required to kill the microorganism or inhibit its growth was noted.

The results of testing for bactericidal activity against several microorganisms are tabulated below:

| Organism | Effective Concentration, p.p.m. | |
|---|---|---|
| | To Kill | To Inhibit Growth |
| Tr. interdigitalis | 50 | |
| C. albicans | 25 | |
| B. subtilis | 50 | |
| E. coli | 100 | |
| M. pyogenes var. aureus | 200 | |
| A. niger | | 100 |
| Pseud. aeruginosa | | 500 |

Similar tests were run on other organisms using different broths. They are Salmonella typhi murium in Sabouraud's liquid medium, Staphylococcus hemolyticus (var. aureus)-strain 209P in heart infusion broth (Difco) having a pH of 7.3 and M. tuberculosis strain 9 in Dubos's liquid medium. The results are as follows:

| Organism | Effective Concentration, p.p.m. | |
|---|---|---|
| | To Kill | To Inhibit Growth |
| Salmonella | | 300 |
| Staphylococcus | 1,000 | 50 |
| M. tuberculous | | 25 |

Tests of the polyacridine against molds disclosed that it inhibited growth of C. globosum, A. brasicola and T. trichoderma speciosa at 100 p.p.m.

EXAMPLE 2

The trihydrochloride of bis(2,4-diaminophenyl)methane was prepared following the general procedure set forth in Example 1 for the preparation of the tetarahydrochloride but using proportionally less hydrogen chloride.

Five grams (0.0148 mol) of bis(2,4-diaminophenyl) methane trihydrochloride, 0.66 grams (0.148 mol) of formamide, 50 ml. of ethylene glycol, and 0.3 ml. of concentrated hydrochloric acid were charged to a reaction flask as in Example 2. The mixture was refluxed for 3 hours under nitrogen and cooled to room temperature. Sodium hydroxide was added to pH 10 when a precipitate formed. The solid product was filtered, washed until neutral, and dried in a vacuum over at 80° C.

There was obtained an 84.5% by weight yield of a polymer having a reduced viscosity 0.06 as a 1% solution in dimethylformamide at 25° C. was obtained. This polymer was determined to have the same polyacridine-type structure as the polymer of Example 1.

The polymer was tested for bactericidal activity following the procedure of Example 1. The results follow.

Organism:  Effective concentration, p.p.m. to kill
B. subtilis _____ 50
C. albicans _____ 50
T. interdigitalis _____ 25

EXAMPLE 3

The procedure given in Example 3 was followed, except using 0.875 grams (0.0148 mol) of N-methylformamide as coreactant.

A 79.5% by weight yield of a polyacridine as in Example 1 having a reduced viscosity as a 1% solution in dimethylformamide at 25° C. of 0.04 was obtained.

EXAMPLE 4

The procedure given in Example 3 was followed, except using 1.10 grams (0.0148 mol) of ethyl formate as coreactant.

An 87% by weight yield of a polyacridine as in Example 1 having a reduced viscosity of 0.04 as a 1% solution in dimethylformamide at 25° C. was obtained.

The polymer was tested for bactericidal activity following the procedure of Example 1. The results are as follows:

| Organism: | Effective concentration, p.p.m. to kill |
|---|---|
| B. subtilis | 100 |
| C. albicans | 50 |
| T. interdigitalis | 25 |

EXAMPLE 5

Into a 500 ml.-three neck round-bottom flask equipped with a magnetic stirrer, thermometer, N₂ inlet and a 2 ft. packed column added 80 ml. of ethylene glycol. 5.0 grams of sodium acetate was dissolved in the glycol and then 11.2 grams of the tetrahydrochloride of bis(2,4-diaminophenyl)methane was dissolved in the reaction mixture at 35° C. 2.2 grams of dimethylformamide was added and heating started under an N₂ blanket. The reaction mixture which was buffered at a pH of 5 was heated to 165° C. A first sample of product was removed after 1.5 hours (1.0 grams) and the remainder of the product (3.4 grams) was recovered after 4.25 hours. Both samples of product were determined to be the same polyacridine as obtained in Example 1. The polymer samples had reduced viscosities of 0.06 and 0.07 respectively as 1% solutions in 5% acetic acid.

EXAMPLE 6

Into a reaction vesel were charged 9.42 grams of the trihydrochloride of bis(2,4-diaminophenyl)methane, 4.84 grams of formanilide and 50 ml. of ethylene glycol. The vessel was evacuated and placed in a thermostatically controlled oil bath. The reaction mixture was heated at 165° C. for four hours and then diluted with 150 ml. of water. Sodium hydroxide solution was added to the reaction mixture until a pH of 10 was obtained. The resulting precipitate was dried under vacuum at 100° C. for 14 hours giving the same polyacridine as obtained in Example 1. The polyacridine had a reduced viscosity of 0 07 as a 1% solution in 5% acetic acid.

EXAMPLE 7

Other polymers possessing bactericidal and fungicidal properties are obtained by repeating the procedure of Example 1 substituting other 1,1-bis(2,4-diaminophenyl) alkanes for the bis(2,4-diaminophenyl)methane. Thus employing 1,1-bis(2,4-diaminophenyl)butane there is obtained a polymer composed primarily of the units:

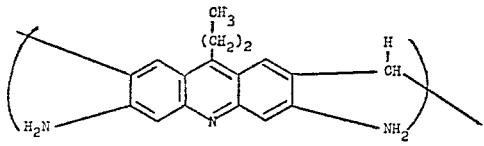

It will be apparent that many modifications and variations may be effected without departing from the scope of the novel concepts of the present invention, and the illustrative details disclosed are not to be construed as imposing undue limitations on the invention.

We claim:
1. A polymer composed primarily of repeating units of the formula

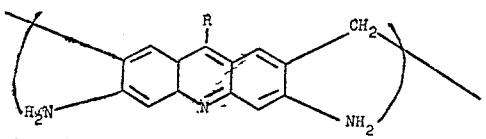

wherein R is hydrogen or alkyl of 1 to 5 carbon atoms.

2. A polymer as claimed in claim 1 wherein R is hydrogen.

3. A process for the preparation of polyacridine polymers which comprises admixing a 1,1-bis(2,4-diaminophenyl)alkane of the formula

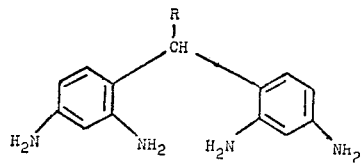

wherein R is a member selected from the group consisting of hydrogen and alkyl radicals of 1 to 5 carbon atoms, or an acid salt of said 1,1-bis(2,4-diaminophenyl)alkane with a coreactant selected from the group consisting of formic acid, esters of formic acid, and N-formylated amines in an acidic reaction medium at a temperature from about 25° C. to 250° C.

4. A process according to claim 3 wherein said coreactant has the formula

wherein X represents OH, OR' or NR''₂ where R' is a hydrocarbon group of 1 to 15 carbon atoms and R'' is independently at each occurrence hydrogen or a hydrocarbon group of 1 to 15 carbon atoms.

5. A process according to claim 3 wherein said 1,1-bis-(2,4-diaminophenyl)alkane is bis(2,4-diaminophenyl)methane.

6. A process according to claim 3 wherein said coreactant is N,N-dimethylformamide.

7. A process according to claim 3 wherein said coreactant is formamide.

8. A process according to claim 4 wherein said coreactant is N-methylformamide.

9. A process according to claim 4 wherein said coreactant is ethyl formate.

10. A process according to claim 4 wherein said coreactant is formanilide.

No references cited.

SAMUEL H. BLECH, *Primary Examiner.*

U.S. Cl. X.R.

167—30; 260—578, 580, 645, 32.6, 30.8, 30.2, 29.2, 31.2